United States Patent [19]

Suzuki

[11] Patent Number: 4,868,594
[45] Date of Patent: Sep. 19, 1989

[54] LIGHT MEASURING DEVICE FOR FLASH EXPOSURE SYSTEM

[75] Inventor: Nobuyuki Suzuki, Kanagawa, Japan

[73] Assignee: Canon Kabushiki Kaisha, Tokyo, Japan

[21] Appl. No.: 233,845

[22] Filed: Aug. 17, 1988

Related U.S. Application Data

[63] Continuation of Ser. No. 875,595, Jun. 18, 1986.

[30] Foreign Application Priority Data

Jun. 25, 1985 [JP] Japan .................................. 60-138191
Jun. 25, 1985 [JP] Japan .................................. 60-138192

[51] Int. Cl.$^4$ .............................................. G03B 7/08
[52] U.S. Cl. .................................. 354/410; 354/425; 354/426
[58] Field of Search ............... 354/413, 414, 416, 417, 354/425, 426, 427, 428, 410

[56] References Cited

U.S. PATENT DOCUMENTS

| | | |
|---|---|---|
| 4,045,142 | 8/1977 | Watanabe ............................ 354/425 |
| 4,076,977 | 2/1978 | Tsunekawa et al. ................. 354/425 |
| 4,160,160 | 7/1979 | Hasegawa et al. .................. 354/416 |
| 4,241,280 | 12/1980 | Abbadessa et al. ................. 354/417 |
| 4,291,979 | 9/1981 | Yuasa et al. ......................... 354/426 |
| 4,300,825 | 11/1981 | Kitawa et al. ....................... 354/417 |
| 4,639,134 | 1/1987 | Bletz .................................... 354/425 |

Primary Examiner—Russell E. Adams
Attorney, Agent, or Firm—Toren, McGeady & Associates

[57] ABSTRACT

This invention relates to light measuring devices, and, more particularly, to light measure devices for a circuit receiving reflected light from an object being photographed with flash illumination. The invention is to obtain an alternating current component (the flash illumination) alone or a mixture of the alternating current component and a fraction of a direct current component (ambient light) as the output of the light measuring circuit only by arranging a feedback circuit having a prescribed gain for low frequencies in the feedback network of the light measuring circuit, the fraction being adjustable by varying the prescribed gain.

4 Claims, 4 Drawing Sheets

VOLTAGE CORRESPONDING TO FILM SPEED AND APERTURE

LIGHT MEASURING DEVICE FOR FLASH EXPOSURE SYSTEM

This is a continuation application of Ser. No. 875,595, filed June 18, 1986,

BACKGROUND OF THE INVENTION:

1. Field of the Invention:

This invention relates to light measuring circuits, and, more particularly, to light measuring circuits for detecting light reflected from an object being photographed with illumination of flash light projected from a strobe device.

2. Description of the Related Art:

As the conventional method for measuring light from the strobe device, it has been customary that as shown in FIG. 1, a condenser is connected in series with the light receiving element, such as a silicon photo-cell, so that when a switch connected across the condenser is opened at the same time as the start of emission of flash light from the strobe device, the photocurrent of the light receiving element starts to accumulate on the condenser, whereby the voltage stored is taken as the light value.

The use of this method to derive a proper flash exposure by controlling the amount of flash light emitted in accordance with the output of the photo-sensitive element requires that the film sensitivity and aperture size be factored into the flash exposure value. For this purpose, it has been the prior art practice that the capacitance of the condenser is made variable or the critical level for the voltage stored on the condenser is is made variable, depending on the film sensitivity and aperture values.

However, the prior art method has drawbacks that the changeover means is necessarily included to increase the complexity of the structure of the mechanisms, and the precision accuracy of the responsiveness changes from means to means, deteriorating the accuracy of light measurement, that while the dynamic range of light is wide, a large limitation is placed on the range of variation of the voltage, so that S/N cannot be taken at a value large enough to discriminate the voltage, and further that in the case when the ambient light enters the light receiving element, the measurement for the flash light cannot accurately be performed. The first two problems can be eliminated by a method that, as shown in FIG. 2, the photocurrent is first logarithmically compressed, and when the photo-current is then expanded by a transistor, the emitter of the transistor is set to a voltage corresponding to the film sensitivity and aperture value so that the current expanded by the transistor is determined by the film sensitivity and aperture value. It is by this current that the condenser is charged. The voltage stored on the condenser is then tested.

Even by such a method, however, the third problem could not be overcome. In more detail, if the flash light (an alternating current light) and the ambient light (a direct current light) impinge at the same time on the photosensitive element, photocurrents $I_{AC}$ and $I_{DC}$ are produced, respectively, and the amplifier of FIG. 2 produces an output voltage Vout expressed by:

$$V_{out} = \frac{kT}{q} \ln \frac{I_{DC} + I_{AC}}{I_S}$$

where $I_S$ is the backward saturation current of the diode.

Now, for the purpose of simplifying the explanation, assuming that the voltage at the emitter of a transistor, whose base is connected to the output of the amplifier, is zero volt, the collector current of the transistor becomes $$I_C = I_{DC} + I_{AC}$$

Because the condenser is charged by this current, the discrimination of the voltage of the condenser cannot be reflected to the measurement of the flash light only.

To eliminate this problem, a filter may be used to cut off the signal of the direct current light, leaving the signal of the alternating current light to the readout of the measured light, as disclosed in U.S. Pat. No. 4,291,979 and Japanese Patent Publications Nos. 47-2756, 47-4088 and 47-4089. In these patents, to be sure, the alternating current component can be obtained out of the photo signal at the output of the light measuring circuit. Yet, upon consideration of the so-called fill-in flash photography, it is desired to add a fraction of the direct current component (of the ambient light) to the alternating current component (of the flash light) when the illumination of the scene is measured. The prior art cannot cope fully with this end. For example, in the above-described U.S. Pat. No. 4,291,979, the output of the light measuring circuit is processed by a very complicated circuit when the direct current component is taken into account before a proper flash exposure value is obtained.

SUMMARY OF THE INVENTION:

An object of the present invention is to provide a light measuring circuit for measuring only the alternating current light by means of very simple construction.

A further object of the present invention is to provide a light measuring circuit for measuring the alternating current light and a portion of the direct current light by means of very simple construction.

Another object of the present invention is to provide a light measuring circuit with a feadback loop cutting off all or part of the direct current light signal, whereby only the alternating current light, or a mixture of the alternating current light and a part of the direct current light can be measured.

Another object of the present invention is to provide a light measuring circuit in which the gain of the feadback loop is made adjustable to take into account a desired fraction of the direct current light together with the alternating current light when the output is read out.

A still further object of the present invention is to provide a light measuring circuit having an operational amplifier across whose input terminals is connected a photosensitive element and between these input and output terminals is connected a first negative feedback circuit, in which a second negative feedback circuit, having a large gain for the low frequency region, is also connected between the input and output terminals of the operational amplifier; thereby, the alternating current signal component only is detected.

Another object of the present invention is to provide a light measuring circuit having an operational amplifier across whose input terminals is connected a photosensitive element and between whose input and output terminals is connected a first negative feedback circuit, in which the connection of a second negative feedback circuit, having a certain particular finite gain for the low frequency region, between the input and output terminals of the operational amplifier enables the light measurement to be performed in such a manner that a fraction of the direct current light, which is determined by the gain of the second negative feedback circuit, is added to the alternating current light.

Other objects of the invention will become apparent from the following description of embodiments thereof taken in conjunction with the accompanying drawings.

Figure 3:
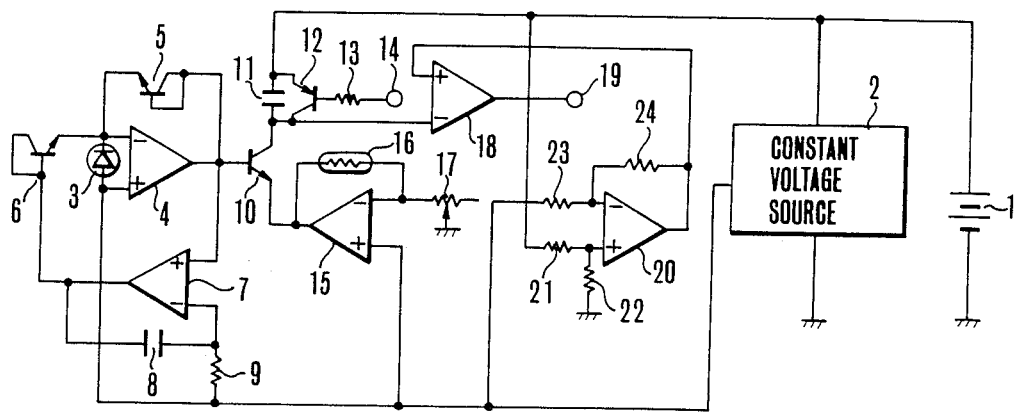
FIG. 3 is a circuit diagram of an embodiment of a light measuring circuit according to the present invention.

DETAILED DESCRIPTION OF THE PREFERRED EMBODIMENTS:

In FIG. 3 there is shown one embodiment of the light measuring circuit according to the present invention, including an electrical power source or battery 1, a constant voltage source 2 for producing a constant voltage regardless of the voltage value of the battery 1, a light receiving element 3 such as silicon photo-cell (SPC), operational amplifiers 4, 7, 15 and 20 (hereinafter called OP amplifier), NPN transistors 5 and 6 of the same characteristic which, because of their collectors and bases being short-circuited, function as diodes, a condenser 8 constituting a Miller integration circuit together with a resistor 9 and the OP amplifier 7, an NPN transistor 10 having the same character as that of the transistors 5 and 6, a condenser 11 for integrating the collector current of the expanding transistor 10, a PNP transistor 12 as a switch for short-circuiting or opening both poles of the condenser 11, a resistor 13, and a control terminal 14. When the potential at the terminal 14 is low level, a base current of the transistor 12 flows through the resistor 13, thereby the transistor 12 is turned on to short-circuit the condenser 11. When the potential at the terminal 14 has high level, the transistor 12 turns off, opening the condenser 11. A temperature compensation resistor 16 has a positive temperature coefficient proportional to the absolute temperature. A variable resistor 17 has resistance values related to the aperture size and film sensitivity. The OP amplifier 15 with the temperature compensation resistor 16 and the resistor 17 produces a voltage having a positive temperature coefficient. A comparator 18 has an inverting input terminal to which the integrated voltage of the condenser 11 is applied and has a non-inverting input to which a prescribed voltage (to be described later) is applied. The output of the comparator 18 is connected to an output terminal 19. Resistors 21 to 24 have their resistance values equalized to one another so that the output of the OP amplifier 20 represents the subtraction of the voltage of the constant voltage source 2 from the voltage of the battery 1. Therefore, the comparator 18 has to test whether the integrated voltage of the condenser 11 is above or below the voltage of the constant voltage source 2.

Before the overall operation of the circuit of FIG. 3 is explained, for the purpose of better understanding, the principle of the operation of that circuit portion which is comprised of the elements 3 to 9 is described by reference to the equivalent circuit of FIG. 4. $V_{IN}$ enters an input terminal 25, and Vout appears at an output terminal 26. The amplifier having a gain A is provided with negative feedback circuits 28 and 29 whose feedback amount is represented by $\beta$, and with another negative feedback circuit 30 whose feedback amount is represented by G. The combined feedback amount of the circuits 29 and 30 becomes $G\beta$.

Here, the transfer characteristic between the input and output terminals 25 and 26 can be expressed in the form:

$$Vout = A(V_{IN} - Vout\beta - VoutG\beta)$$

$$Vout = \frac{V_{IN}}{\frac{1}{A} + \beta(1 + G)}$$

Then, assuming that the value of the gain A is sufficiently large, and defining the transfer function of G as $$G = 1 + \frac{1}{j\omega CR}$$

give $$Vout = \frac{V_{IN}}{\beta\left(2 + \frac{1}{j\omega CR}\right)}$$

This implies that when the input signal is the direct current, because $\omega = 0$, $$Vout = 0$$

namely, no output is produced, and that when the input signal is $$\frac{1}{j\omega CR} << 1$$

it becomes $$Vout = \frac{V_{IN}}{2\beta}$$

this value of the output is half as large as when there is only the feedback circuit 28.

Figure 4:
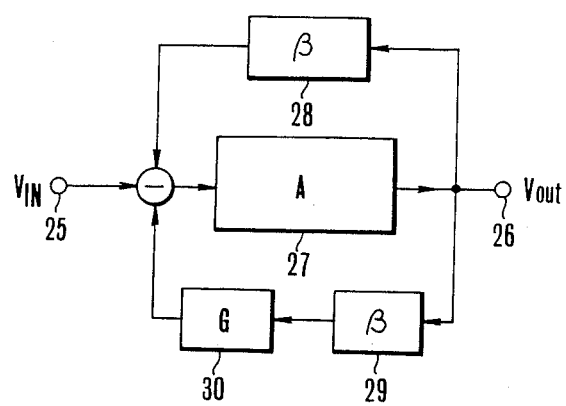
FIG. 4 is an equivalent diagram of the light measuring circuit of FIG. 3.

The foregoing may be summarized that in case G is a low pass filter, no direct current component is produced from the output terminal 26 at all, but the alternating current component only appears thereat. So, returning to FIG. 3, as the various portions of the circuit are supplied with voltage from the battery 1, the constant voltage source 2 produces a constant voltage which is applied to the OP amplifiers 4 and 15 at their non-inverting inputs, and also to the resistors 9 and 23 at one of their respective ends. Since the OP amplifier 7, condenser 8 and resistor 9 form the Miller integration circuit, when the values of the condenser 8 and resistor 9 are C and R, respectively, the transfer function of the Miller integration circuit is, on assumption that the open gain of the OP amplifier 7 is infinity, $$1 + \frac{1}{j\omega CR},$$

corresponding to G of FIG. 4. Also, assuming that the gain of the OP amplifier 4 is A and the feedback amount of each of the transistors 5 and 6 is $\beta$, the photocurrent of the light receiving element 3 of FIG. 3 may be taken as equivalent to the input signal $V_{IN}$ of FIG. 4.

Therefore, as has been described in connection with FIG. 4, the output of the OP amplifier 4 takes a value proportional to the voltage drop of the transistor 5 resulting from the alternating current component.

So, with an object illuminated with flash light from the strobe device (not shown), that part of the photocurrent produced from the light receiving element 3 which is attributed to the ambient light (which exists prior to the firing of the strobe device), or the photodirect current ($I_{DC}$), flows only through the transistor 6, while the photo-alternating current ($I_{AC}$) produced due to the flash light received flows through the transistors 5 and 6 each in one half thereof. Thus, the voltage produced across the transistor 5 by the half of the photoalternating current is reflected to the output of the OP amplifier 4 by the expression:

$$V_{out} \simeq \frac{kT}{q} \ln \frac{\left(\frac{I_{AC}}{2}\right)}{I_S} + V_R$$

where $V_R$: the voltage of the constant voltage source 2;
Vout: the voltage at the output of the OP amplifier 4;
k: Boltzmann's constant;
T: the Absolute temperature;
q: the charge amount This voltage is then applied to the base of the transistor 10. Also applied to its emitter is the voltage from the OP amplifier 15. Now assuming that the resistor 16 has a value of $\alpha T$ ($\alpha$ being a constant), and the resistor 17 has a value Rx, then the voltage at the output of the OP amplifier 15 takes the following value:

$$V_R \cdot \left(1 + \frac{\alpha T}{Rx}\right)$$

Therefore, the voltage across the base-emitter path of the transistor 10 is determined to be:

$$\frac{kT}{q} \ln \frac{\left(\frac{I_{AC}}{2}\right)}{I_S} - \frac{V_R}{Rx} \cdot \alpha T = \frac{kT}{q} \ln \frac{\left(\frac{I_{AC}}{2}\right) e^{-\frac{V_R \alpha q}{Rxk}}}{I_S}$$

-continued $$\text{Here putting } e^{-\frac{V_{R\alpha q}}{Rxk}} = \alpha_0$$

$$\text{gives } \frac{kT}{q} \ln \frac{\left(\frac{I_{AC}}{2}\right)\alpha_0}{I_S}$$

The current flowing to the collector of the transistor 10 is found to be $$\left(\frac{I_{AC}}{2}\right)\alpha_0$$

since the value $\alpha_0$ is variable as determined by the relationship of the resistors 16 and 17, if the aperture value and the film sensitivity are set in the resistor 17, the current flowing to the collector of the transistor 10 is varied as a function of the photocurrent $I_{AC}$ generated in the photosensitive element 3 by the flash light, the aperture size and the film sensitivity.

Let us now embark on the description of the operation of the circuit of FIG. 3 as a whole. When the potential at the input terminal 14 is changed from low to high level in synchronism with the start of firing of the strobe device as is well known in the art, the condenser 11 starts to integrate the collector current of the transistor 10. Since the values of the resistors 21 and 24 are equal to one another, for, as the voltage of the battery 1 is V, the output of the OP amplifier 20 becomes $V - V_R$, when the duration of integration of the collector current of the transistor 10 has reached a limit at which the voltage across the condenser 11 rises to $V_R$, the output of the comparator 18, or the signal at the output terminal 19, inverts from low to high level. This signal is given to the strobe, thereby stopping the firing.

By the above-described feature of the invention, it is possible to measure the reflection of the flash light (alternating current light) in isolation from the ambient light, and control the amount of emitted flash light accurately as the timing condenser is charged with the current obtained by computing the readout with the aperture value and the film sensitivity.

Figure 1:
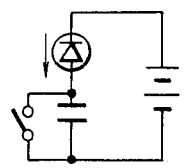
FIG. 1 is a circuit diagram illustrating an example of the conventional light measuring circuit.
Figure 2:
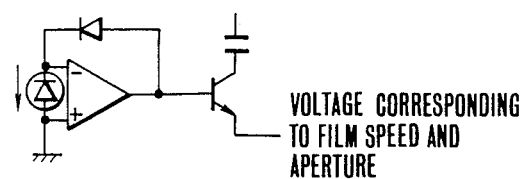
FIG. 2 is a circuit diagram illustrating an example of an improvement of the light measuring circuit of FIG. 1.

It should be pointed out in connection with the light measuring circuit of FIG. 3 that since, as has already been mentioned above, the alternating current component out of the photocurrent generated in the photosensitive element 3 is divided into equal halves which flow to the respective transistors 5 and 6, because only that half current is used to make up the voltage at the output of the OP amplifier 4 after the drop of the voltage of the transistor 5, the circuit of the invention is inferior in SN ratio to the conventional circuit of FIG. 2 by a factor corresponding to the $\frac{1}{2}$ times reduction of the signal efficiency.

Figure 5:
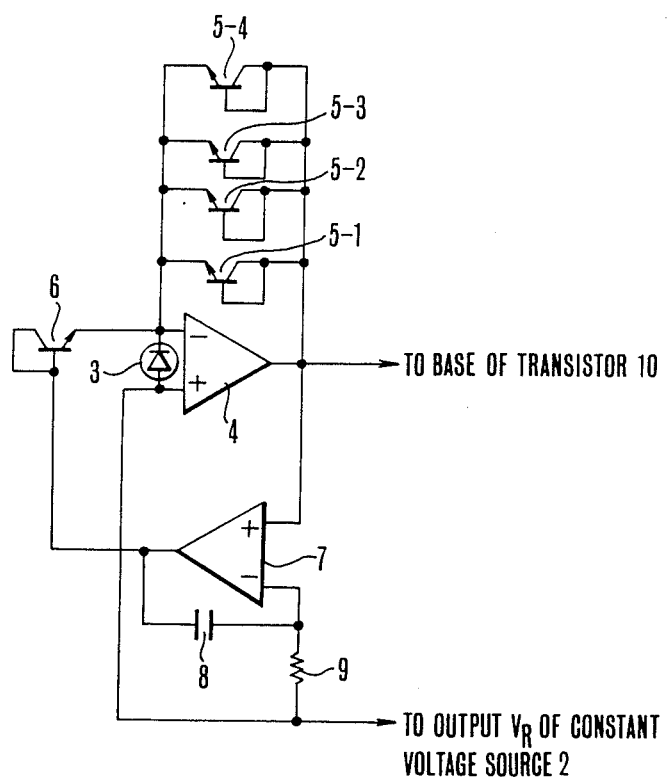
FIG. 5 is a circuit diagram of another embodiment of the light measuring circuit according to the present invention.

FIG. 5 illustrates an example of a modification of the circuit of FIG. 3 with an improvement of the signal efficiency. The modification is made in that portion of the circuit which has the elements 3 to 9 of FIG. 3, and the same reference numerals have been employed to denote the similar parts of FIG. 5 to those shown in FIG. 3.

A plurality of, in this instance, four transistors 5-1, 5-2, 5-3 and 5-4 of the same characteristic as that of the transistor 5 of FIG. 3 are connected in parallel to one another, so that the feedback amount of the feedback circuit 29 of FIG. 4 is reduced ¼ times to β/4. So, upon calculation of the transfer function in the same way as in the first embodiment, one obtains:

$$V_{out} = A(V_{IN} - V_{out}\beta - V_{out}G\beta/4)$$

$$\therefore V_{out} = \frac{V_{IN}}{\frac{1}{A} + \beta\left(1 + \frac{G}{4}\right)}$$

As the gain of A is sufficiently large, the transfer function for G is $$G = 1 + \frac{1}{j\omega CR}$$

and ω is $$\frac{1}{j\omega CR} << 1,$$

it becomes:

$$V_{out} = \frac{V_{IN}}{\frac{5}{4}\beta}$$

This result is equal to 4/5 of that of the feedback circuit 28 alone. Thus, the signal efficiency is not halved as in the circuit of FIG. 3, and the SN ratio is improved.

Therefore, the direct current component in the photocurrent generated in the light receiving element 3 all flows through the transistor 6, while 1/5 of the alternating current component flows through the transistor 6, and the remaining fraction or 4/5 flows through the transistor 5.

Though, in FIG. 5, the number of transistors of the diode connection in the feedback network between the inverting input and output of the OP amplifier 4 is taken at 4, it is to be understood that it is not limited to 4, and at least two are sufficient for improving the SN ratio. The larger the number, the higher the improvement.

Figure 6:
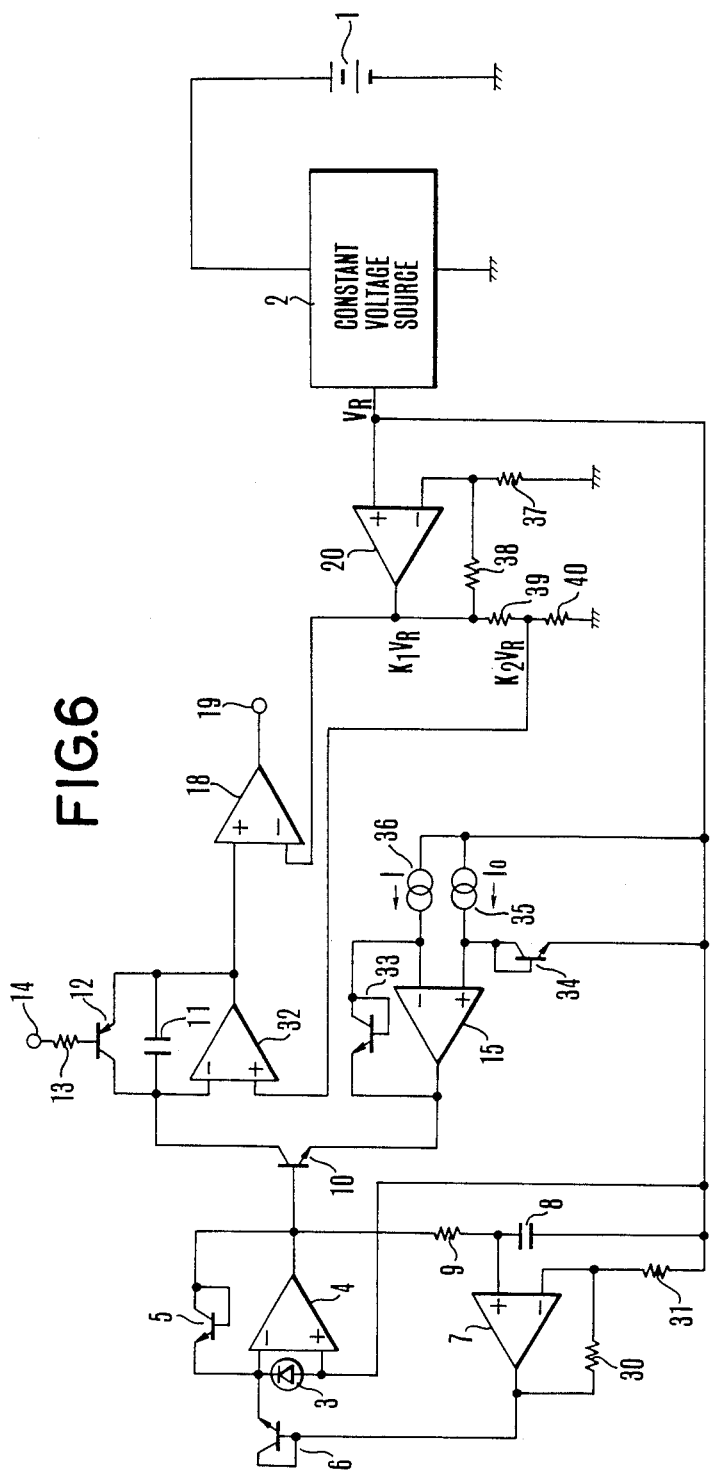
FIG. 6 is a circuit diagram of still another embodiment of the light measuring circuit according to the present invention.

In FIG. 6, the electrical circuit diagram illustrates another embodiment of the light measuring circuit according to the invention, used in a firing control circuit for the strobe device. The circuit of FIG. 6 includes an electrical power source or battery 1, a constant voltage source 2 for producing a constant voltage $V_R$ on the basis of the voltage of the battery 1, a light receiving element or silicon photocell 3, an operational amplifier 4 across whose inputs is connected the photocell 3 and between whose input and output is connected a transistor 5 of the diode connection (a first negative feedback circuit), a low-pass filter comprised of a condenser 8 and a resistor 9 and having an output connected to the non-inverting input of an operational amplifier 7, resistors 30 and 31 whose resistance ratio determines the mu-factor of the operational amplifier 7, and a transistor 6 of the diode connection having the same characteristic as that of the transistor 5. These transistors 5 and 6, the low-pass filter 8, 9, the resistors 30 and 31, the operational amplifiers 4 and 7 and the photocell 3 constitute the light measuring circuit. The low-pass filter and resistors 30 and 31 constitute a second negative feedback circuit whose gain is zero in the high frequency region but has a finite value in the low frequency region.

The circuit of FIG. 6 further includes constant current sources 35 and 36 for producing currents $I_0$ and $I$, respectively, transistors 33 and 34 of the diode connection having the same characteristic as that of the transistors 5 and 6, an operational amplifier 15, an expanding transistor 10 having the same characteristic as that of the transistors 5 and 6, a condenser 11 for integrating the collector current of the expanding transistor 10, a switching transistor 12 whose collector-emitter path is connected across the condenser 11, a resistor 13, and a control terminal 14. When the potential at the control terminal 14 is at a low level, the transistor 12 is conducting to short-circuit the condenser 11. When the potential changes to a high level, the transistor 12 turns off, opening the condenser 11.

An operational amplifier 20, with resistors 37 and 38, produces an output in the form of a voltage $K_1V_R$ which is applied to a voltage divider of resistors 39 and 40. A voltage $K_2V_R$ appears at a point on connection between the resistors 39 and 40. The output of an amplifier 32 is compared with the output of the amplifier 20 by a comparator 18.

The operation of the circuit of such construction is as follows: As the voltage of the battery 1 is supplied to the various portions of the circuit, the output of the amplifier 4 is processed by the low-pass filter so that the direct current component containing the low frequency region is extracted and applied to the non-inverting input terminal of the amplifier 7. Since the mu-factor for the direct current component of the amplifier 7 is determined by the ratio of the resistance values of the resistors 30 and 31, that part of the photocurrent generated in the photosensitive element 3 which is attributed to the ambient light, that is, the direct current component, is divided at a rate corresponding to the mu-factor into parts which flow to the respective transistors 5 and 6.

That is, the resistance ratio α of the resistors 30 and 31, that fraction $I_1$ of the direct current component which flows to the transistor 5, the remaining fraction $I_2$ of the direct current component which flows to the transistor 6 and the direct current output $V_{DC}$ of the amplifier 4 are related by the following formulae:

$$V_{DC} \approx \frac{kT}{q} \ln \frac{I_1}{I_S} + V_R$$

$$(\alpha + 1)(V_{DC} - V_R) \approx \frac{kT}{q} \ln \frac{I_2}{I_S}$$

These give $$I_1 = I_S \exp\left\{\frac{q}{kT}(V_{DC} - V_R)\right\}$$

$$I_2 = I_S \exp\left\{\frac{q}{kT}(\alpha + 1)(V_{DC} - V_R)\right\}$$

$I_1 + I_2$ = the direct current component of the photocurrent generated in the photosensitive element 3.

where
  k: Boltzmann's constant;
  T: the absolute temperature;
  q: the charge amount;
  $I_S$: the backward saturation current of the transistors 5, 6

Therefore, by choosing an appropriate value of the resistance ratio of the resistors 30 and 31, that fraction of the direct current component generated in the photosensitive element which flows to the transistor 5 can be adjusted to a desired value.

As for the alternating current component of the photocurrent generated in the photosensitive element 3, because it is damped by the low pass filter before entering the amplifier 7, the output of the amplifier 7 includes almost none of the alternating current component, as almost all of the alternating current component flows to the transistor 5. As a result, this light measuring circuit has a very high SN ratio for the alternating current component.

In this light measuring circuit, the output of the amplifier 4 is contributed exclusively from the voltage of the transistor 5 as determined by the current flowing through the transistor 5, and, therefore, as has been described above, represents the mixture of the alternating current of the photocurrent of the photosensitive element 3 and that fraction of the direct current of the photocurrent which is determined by the resistors 30 and 31.

The above-described feature affords a capability that, for example, when the reflection of the flash light of the strobe device is measured, the illumination of the ambient light can be partly taken into account by the resistance ratio of the resistors 30 and 31 in deriving a flash exposure value. Thus, the light measuring circuit of FIG. 6 is made suited for fill-in flash photography.

The output of the amplifier 4 is then applied to the base of the transistor 10. Meanwhile, the emitter of the transistor 10 is supplied with the output of the amplifier 15. Upon setting the output current I of the constant current source 36 in such a way as to change 2 times for every one step of variation of each of the film sensitivity and the aperture size, the output voltage $V_{15}$ of the amplifier 15 becomes:

$$V_{15} \simeq \frac{kT}{q} \ln \frac{I_0}{I_S} - \frac{kT}{q} \ln \frac{I}{I_S}$$
$$= \frac{kT}{q} \ln \frac{I_0}{I}$$

where $I_0$ is constant.

Thus, the voltage applied to the emitter of the transistor 10 functions as the set information accurately corresponding to the expansion characteristic of the transistor 10.

Therefore, the collector current of the transistor 10 takes the form of an expanded current representing the accurate computation of the above-described readout and the preset values of the parameters.

When the signal at the terminal 14 is changed from the low to high level in synchronism with the start of emission of flash light, the transistor 12 turns off, thereby the condenser 11, constituting the Miller integration circuit together with the amplifier 32, is charged with the collector current of the transistor 10. Since, at this time, the constant voltage $K_2V_R$ is applied to the non-inverting input terminal of the amplifier 32, the collector potential of the transistor 10 is always maintained at the constant $K_2V_R$. In this state, the integration of the condenser 11 is performed.

As the integrating operation advances, when the output of the amplifier 32 reaches the constant voltage $K_1V_R$, the output of the comparator 18 changes from the low level to the high level. Responsive to this change, a switching circuit (not shown) operates stopping the firing of the strobe device.

As has been described above, in the present invention, not only the flash light but also a prescribed fraction of the ambient light can be measured by adjusting the resistance ratio. In application to the light measuring circuit for flash light adjustment, a proper flash adjusting operation is carried out when in fill-in flash photography.

As has been described above, in the present invention, the use of a very simple arrangement of the feedback loops enables the readout of the alternating current light alone or the mixture of the alternating current light and a desired fraction of the direct current light to be directly obtained from the light measuring circuit. As the light measuring circuit for flash photography, for example, it is made possible to obtain a very suitable light measuring circuit.

It should be noted that the resistors 30 and 31 in the FIG. 6 embodiment may be replaced by variable resistors.

What is claimed is:

1. A light measuring device comprising:
   (a) an amplifier circuit, said circuit having a first and a second input terminal;
   (b) a light sensitive element connected between said first and said second input terminals;
   (c) a diode connected between an output terminal and said first input terminal of said amplifier circuit; and
   (d) a series circuit connected between said output and said first input terminal of said amplifier circuit, said series circuit consisting of a circuit structure including a condenser and an amplifier and having a predetermined gain for low frequency signals, and a further diode connected to said circuit structure, said further diode having a cathode connected to the first input terminal of said amplifier circuit and an anode connected to said circuit structure.

2. A device according to claim 1, wherein the gain of said circuit structure is large for low frequency signals.

3. A light measuring device according to claim 1, wherein said diode is composed of diode-connected transistors.

4. (a) a photosensitive element;
   (b) an amplifier circuit having inputs connected to said photosensitive element;
   (c) a first feedback circuit arranged between an output and an input circuit of said amplifier circuit, said first feedback circuit having a prescribed gain for low frequency, and feeding back an ambient light component of the output of said amplifier circuit at a rate corresponding to said gain, said first feedback circuit including a low-pass filter circuit including an operational amplifier with a condenser connected to an input thereof; and
   (d) a second feedback circuit arranged between the output and the input circuit of said amplifier circuit.

* * * * *